(12) United States Patent
Boyeldieu et al.

(10) Patent No.: US 8,784,092 B2
(45) Date of Patent: Jul. 22, 2014

(54) DEVICE FOR THE PRODUCTION OF A COMPOSITE MATERIAL PART INTEGRATING A DRAINAGE SYSTEM

(75) Inventors: Aurelien Boyeldieu, Saint Sebastien (FR); Virginie Charbonnier, La Chapelle Heulin (FR)

(73) Assignee: Airbus Operations SAS, Toulouse (FR)

( * ) Notice: Subject to any disclaimer, the term of this patent is extended or adjusted under 35 U.S.C. 154(b) by 567 days.

(21) Appl. No.: 12/678,158

(22) PCT Filed: Sep. 23, 2008

(86) PCT No.: PCT/FR2008/051696
§ 371 (c)(1),
(2), (4) Date: Mar. 15, 2010

(87) PCT Pub. No.: WO2009/050362
PCT Pub. Date: Apr. 23, 2009

(65) Prior Publication Data
US 2010/0260884 A1    Oct. 14, 2010

(30) Foreign Application Priority Data

Sep. 24, 2007 (FR) ..................... 07 57795

(51) Int. Cl.
*B29C 70/44* (2006.01)
(52) U.S. Cl.
USPC ........ 425/389; 425/111; 425/387.1; 425/388; 425/403; 425/405.1; 425/438; 425/501; 425/502; 425/504; 425/517
(58) Field of Classification Search
CPC ...... B29C 43/12; B29C 43/56; B29C 43/203; B29C 70/44; B29C 70/443; B29C 70/547; B29C 70/548; B29C 2043/3642; B29C 2043/3644; B29C 7/06

USPC ......... 425/111, 112, 117, 121, 380, 388, 389, 425/403, 405.1, 504, DIG. 47, DIG. 60, 501, 425/502, 503, 517, 405.2, 420, 424, 436 R, 425/438
See application file for complete search history.

(56) References Cited

U.S. PATENT DOCUMENTS 3,146,148 A * 8/1964 Mitchella et al. ............. 156/382
4,132,755 A * 1/1979 Johnson ....................... 264/553
(Continued)

FOREIGN PATENT DOCUMENTS

| DE | 198 53 709 C1 | 2/2000 |
| FR | 2 894 869 A1 | 6/2007 |
| WO | 2005/053939 A1 | 6/2005 |

OTHER PUBLICATIONS

International Search Report, dated Jun. 5, 2009, from corresponding PCT application.

*Primary Examiner* — Seyed Masoud Malekzadeh
(74) *Attorney, Agent, or Firm* — Young & Thompson

(57) ABSTRACT

A device for producing a composite material part designed to be in contact with aerodynamic flows, in particular a portion of the fuselage, whereby the device includes at least one mold (32), elements (34, 36, 38) for compressing the part that is to be produced, as well as a system for drainage of the gases emanating from the part that is to be produced that includes at least one plate (42), characterized in that the at least one plate (42) includes a number of openings (44) whose shapes and/or arrangement limit the degradation of the aerodynamic characteristics of the part that is to be produced.

20 Claims, 2 Drawing Sheets

(56) References Cited

U.S. PATENT DOCUMENTS

| | | | |
|---|---|---|---|
| 4,292,356 A * | 9/1981 | Whitemore et al. | 428/116 |
| 4,312,829 A * | 1/1982 | Fourcher | 264/571 |
| 4,357,193 A * | 11/1982 | McGann et al. | 156/286 |
| 4,548,859 A * | 10/1985 | Kline et al. | 442/312 |
| 4,622,091 A * | 11/1986 | Letterman | 156/286 |
| 4,676,853 A * | 6/1987 | Lerma | 156/87 |
| 4,869,770 A * | 9/1989 | Christensen et al. | 156/286 |
| 4,902,215 A * | 2/1990 | Seemann, III | 425/406 |
| 4,942,013 A * | 7/1990 | Palmer et al. | 264/511 |
| 4,975,311 A * | 12/1990 | Lindgren | 428/156 |
| 4,983,345 A * | 1/1991 | Kromrey | 264/313 |
| 5,009,687 A * | 4/1991 | Kromrey | 65/106 |
| 5,023,987 A * | 6/1991 | Wuepper et al. | 29/402.11 |
| 5,052,906 A * | 10/1991 | Seemann | 425/112 |
| 5,106,568 A * | 4/1992 | Honka | 264/510 |
| 5,116,216 A * | 5/1992 | Cochran et al. | 425/504 |
| 5,123,985 A * | 6/1992 | Evans et al. | 156/213 |
| 5,242,651 A * | 9/1993 | Brayden et al. | 264/510 |
| 5,302,107 A * | 4/1994 | Dahlgren | 425/388 |
| 5,322,665 A * | 6/1994 | Bernardon et al. | 264/571 |
| 5,439,635 A * | 8/1995 | Seemann | 264/510 |
| 5,464,337 A * | 11/1995 | Bernardon et al. | 425/112 |
| 5,565,162 A * | 10/1996 | Foster | 264/257 |
| 5,576,030 A * | 11/1996 | Hooper | 425/112 |
| 5,601,852 A * | 2/1997 | Seemann | 425/112 |
| 5,702,663 A * | 12/1997 | Seemann | 264/510 |
| 5,863,452 A * | 1/1999 | Harshberger et al. | 249/83 |
| 5,897,739 A * | 4/1999 | Forster et al. | 156/285 |
| 5,939,013 A * | 8/1999 | Han et al. | 264/510 |
| 5,968,445 A * | 10/1999 | McCarville et al. | 264/571 |
| 6,039,832 A * | 3/2000 | McCarville | 156/292 |
| 6,090,335 A * | 7/2000 | McClure et al. | 264/510 |
| 6,203,749 B1 * | 3/2001 | Loving | 264/510 |
| 6,311,542 B1 * | 11/2001 | Sloman | 73/12.13 |
| 6,385,836 B1 * | 5/2002 | Coltrin | 29/402.18 |
| 6,406,659 B1 * | 6/2002 | Lang et al. | 264/510 |
| 6,440,566 B1 * | 8/2002 | Maligie et al. | 428/412 |
| 6,508,974 B1 * | 1/2003 | Loving | 264/510 |
| 6,521,296 B1 * | 2/2003 | Seal et al. | 427/294 |
| 6,555,045 B2 * | 4/2003 | McClure et al. | 264/510 |
| 6,565,792 B2 * | 5/2003 | Hemphill | 264/510 |
| 6,586,054 B2 * | 7/2003 | Walsh | 427/430.1 |
| 6,630,095 B2 * | 10/2003 | Slaughter et al. | 264/510 |
| 6,656,411 B1 * | 12/2003 | McClure et al. | 264/510 |
| 6,739,861 B2 * | 5/2004 | Cournoyer et al. | 425/520 |
| 6,818,159 B2 * | 11/2004 | Hinz | 264/40.6 |
| 6,843,953 B2 * | 1/2005 | Filsinger et al. | 264/510 |
| 6,851,945 B2 * | 2/2005 | Potter et al. | 425/389 |
| 7,029,267 B2 * | 4/2006 | Caron | 425/389 |
| 7,112,299 B2 * | 9/2006 | Merrick | 264/510 |
| 7,147,448 B2 * | 12/2006 | Slaughter et al. | 425/129.1 |
| 7,160,498 B2 * | 1/2007 | Mataya | 264/510 |
| 7,186,367 B2 * | 3/2007 | Hou et al. | 264/571 |
| 7,189,345 B2 * | 3/2007 | Sewell et al. | 264/101 |
| 7,204,951 B2 * | 4/2007 | Simpson et al. | 264/523 |
| 7,216,832 B2 * | 5/2007 | Simpson et al. | 244/119 |
| 7,393,494 B2 * | 7/2008 | Mataya et al. | 264/510 |
| 7,409,920 B2 * | 8/2008 | Mataya et al. | 114/357 |
| 7,595,112 B1 * | 9/2009 | Cano et al. | 428/408 |
| 7,727,448 B2 * | 6/2010 | Boutefeu et al. | 264/257 |
| 7,727,449 B2 * | 6/2010 | Lorenz et al. | 264/258 |
| 2002/0020934 A1 * | 2/2002 | Hinz | 264/40.6 |
| 2004/0017020 A1 * | 1/2004 | Loving | 264/134 |
| 2004/0070108 A1 * | 4/2004 | Simpson et al. | 264/236 |
| 2004/0115299 A1 * | 6/2004 | Potter et al. | 425/389 |
| 2005/0035478 A1 * | 2/2005 | Sewell et al. | 264/102 |
| 2005/0048260 A1 * | 3/2005 | Modin et al. | 428/138 |
| 2005/0253309 A1 * | 11/2005 | Hou et al. | 264/571 |
| 2006/0068170 A1 | 3/2006 | Hanson | |
| 2006/0246796 A1 * | 11/2006 | Duffy | 442/38 |
| 2007/0158878 A1 * | 7/2007 | Lauridsen | 264/511 |
| 2009/0020645 A1 | 1/2009 | Cacciaguerra | |

* cited by examiner

DEVICE FOR THE PRODUCTION OF A COMPOSITE MATERIAL PART INTEGRATING A DRAINAGE SYSTEM

This invention relates to a device for the production of a composite material part, whereby said device integrates a drainage system and is more particularly designed for the production of panels with a complex shape, in particular with a double curvature.

Aeronautical construction tends to use composite materials for the production of certain parts of an aircraft, in particular the panels that form the outside skin of the fuselage, so as to reduce the on-board weight.

In contact with significant aerodynamic flows, the outside surface of the fuselage is to have a surface condition that imparts the best aerodynamic characteristics to the aircraft. Actually, the surface defects produce an increase of the drag and consequently an increase of the energy consumption of the apparatus.

According to another constraint, to prevent the phenomena of erosion, it is also necessary that the outside surface of the fuselage in contact with air not comprise any porosity.

The composite material parts comprise a fiber-reinforced resin matrix. According to a common embodiment, the fibers come in the form of one or more fold(s) that may or may not be woven, pre-impregnated with thermosetting resin. As a variant, the fibers cannot be pre-impregnated. In this case, at least one resin film is used.

To ensure the consolidation of the composite material part, it is necessary to increase the temperature to obtain the polymerization of the resin. During polymerization, pressure is exerted so as to expel the air and the solvents to reduce the porosity and to prevent the risks of defects that can reduce the mechanical characteristics of the part.

This invention relates more particularly to the operating procedure that consists in using a compacting bladder for exerting pressure and an autoclave for polymerization. Such an operating procedure is used for the process for production of an aircraft fuselage made of composite material that is described in the document FR-2,894,869.

According to this operating procedure, it is necessary to provide drainage means that are arranged between the part and the bladder for evacuating gases.

In FIG. 1, a device of the prior art is shown. The composite material part that is attached to a mold 12 and covered by a compacting bladder 14 is shown at 10. Drainage means, in the form of a draining fabric 16, are inserted between the part 10 and the bladder 14. In addition, a non-perforated film 18, making it possible to allow the gases to pass but holding the resin during polymerization, is inserted between the part 10 and the draining fabric 16.

In addition, the device comprises a seal 20, provided for sealing, inserted between the mold 12 and the bladder 14, on the periphery of the part 10 as well as means 22 for ensuring the negative pressure and/or the evacuation of gases.

Preferably, it is possible to provide a separating film 24 in direct contact with the part, promoting the withdrawal of different layers attached to the part at the end of the process.

Other means of drainage, for example a draining fiberglass 26, can be provided.

So as to shape the surface of the part 10 that is not in contact with the mold 12, a piece of sheet metal 28, also called a shaping plate, can be placed between the draining fabric 16 and the bladder 14. This shaping plate 28 also makes it possible to smooth the surface and to homogenize the distribution of the compressive forces exerted by the bladder on the surface of the part 10. Also, this shaping plate is smooth and does not comprise any rough spots to ensure the smoothing function.

When the part has large dimensions, which is the case of panels for the fuselage, the installation of the drainage fabric proves problematical, the fabric having a flexible structure that can crumple. Actually, if the drainage fabric is deposited with folds, the latter multiply over the outside surface of the composite material panel that is thus marked. These marks are not acceptable because they result in increasing the drag.

Consequently, the installation of the drainage fabric is to be carried out with attention to detail, which leads to making this operation long and tedious.

This issue is accentuated in the case of panels with double curvature. Actually, in this case, the draining fabric cannot adapt, without folding, to the outside surface of the composite material panel and inevitably comprises folds.

One solution then consists in not using a single piece of draining fabric that can cover the entire panel but a number of pieces to obtain a three-dimensional shape that is adapted to the shape of the panel.

However, this solution is not satisfactory because it is relatively long and expensive because of the multiplication of the parts to be attached. In addition, as above, the installation is to be implemented with attention to detail to avoid crumpling the draining fabric and marking the outside surface of the panel.

Finally, the junction zones between the parts have a tendency to mark the outside surface.

Also, the purpose of this invention is to overcome the drawbacks of the prior art by proposing a device for the production of a composite material part that integrates a drainage system simplifying its installation and limiting the risk of marks appearing on the surface of the part that is produced, able to degrade the aerodynamic characteristics of said part.

For this purpose, the invention has as its object a device for producing a composite material part that is designed to be in contact with aerodynamic flows, in particular a portion of the fuselage, whereby said device comprises at least one mold, means for compressing the part to be produced, as well as a system for drainage of gases emanating from the part that is to be produced that comprises at least one plate, characterized in that said at least one plate comprises a number of openings whose shapes and/or arrangement limit the degradation of the aerodynamic characteristics of said part to be produced.

BRIEF DESCRIPTION OF THE DRAWINGS

Other characteristics and advantages will emerge from the following description of the invention, a description that is provided only by way of example with regard to the accompanying drawings in which.

DETAILED DESCRIPTION OF THE PREFERRED EMBODIMENTS

Figure 1:
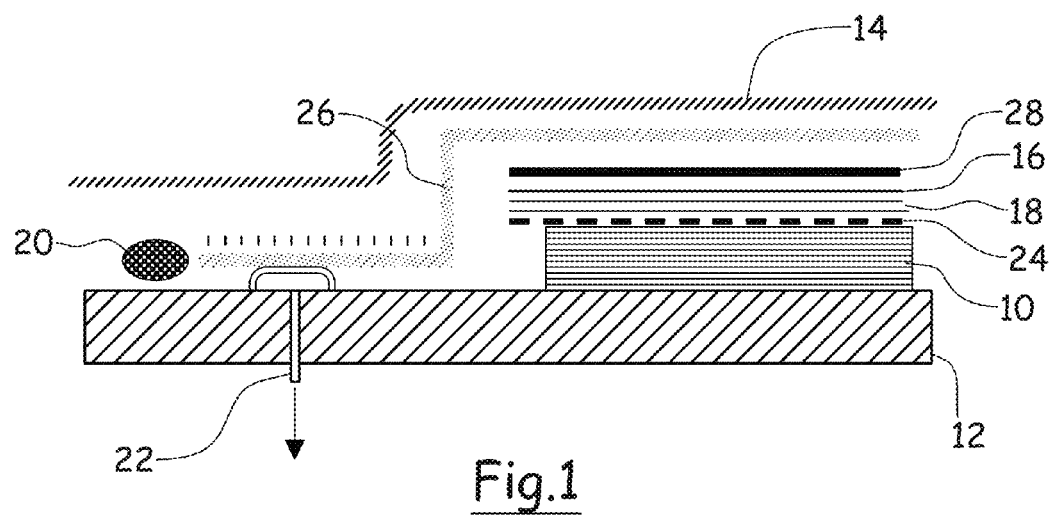
FIG. 1 is a cutaway that illustrates a device for producing a composite material part according to the prior art.
Figure 2:
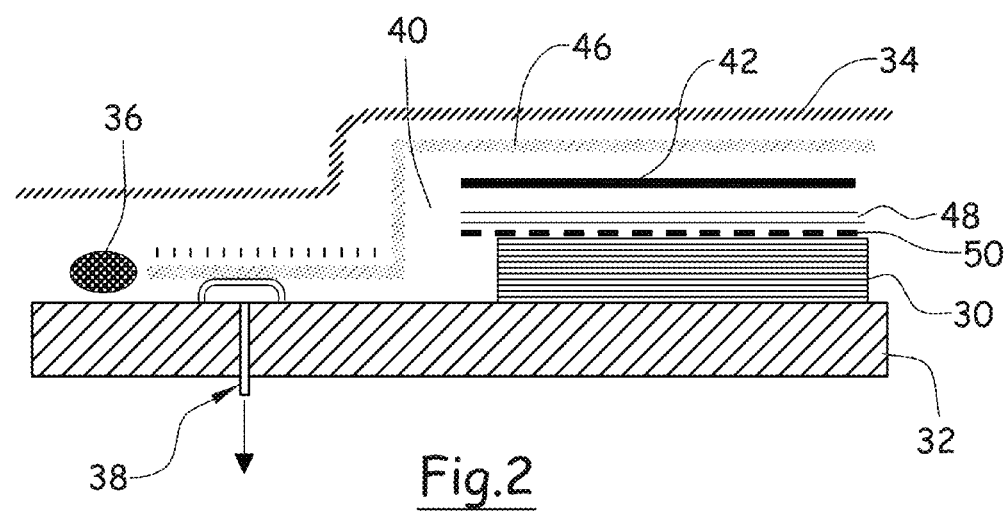
FIG. 2 is a cutaway that illustrates a device for producing a composite material part according to the invention.
Figure 3:
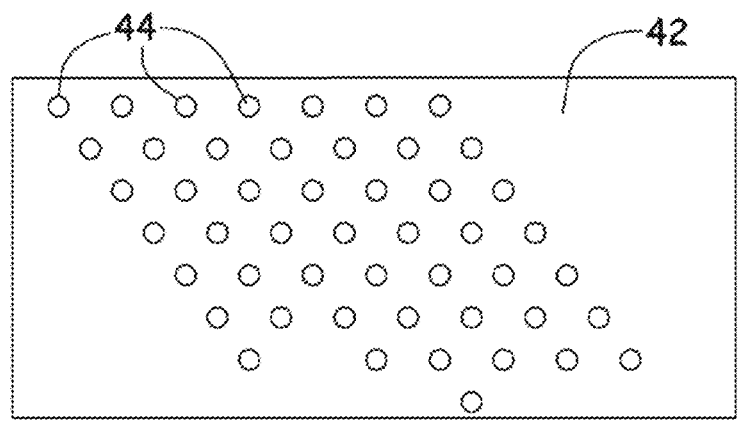
FIG. 3 is a top view that illustrates a portion of a draining plate according to the invention.
Figure 4:
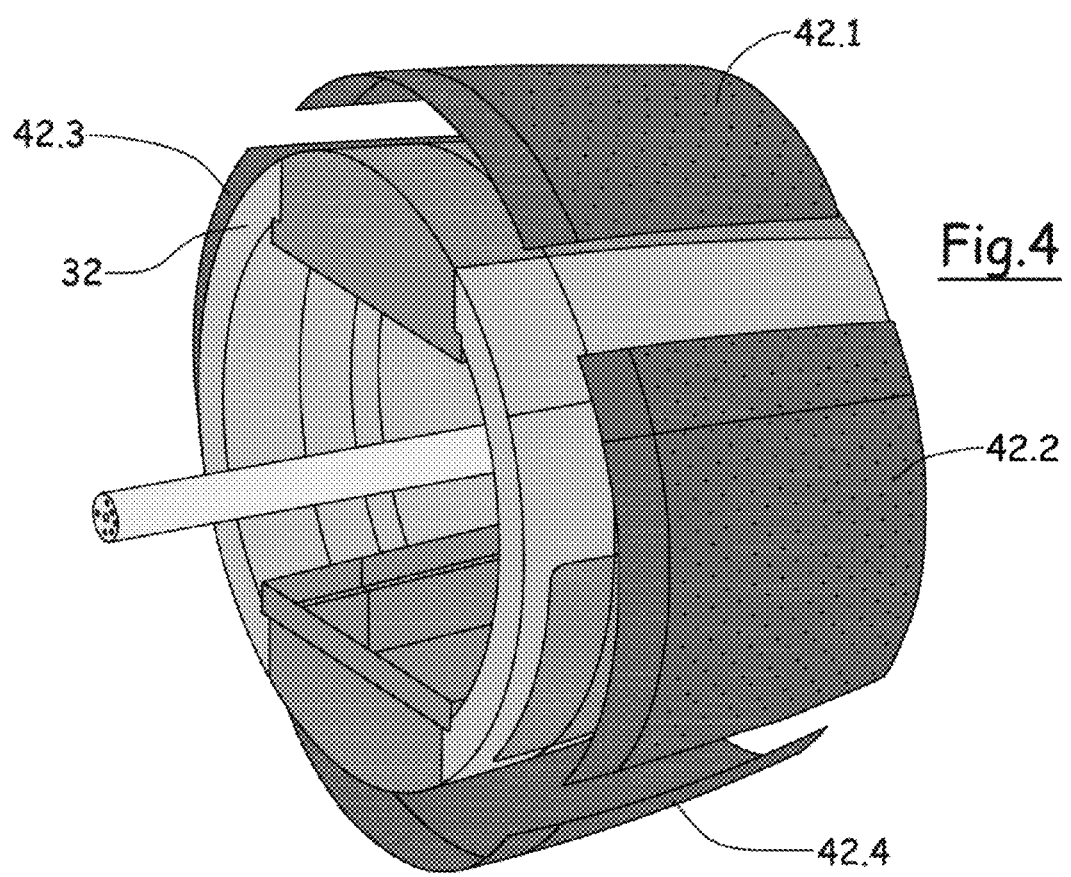
FIG. 4 is a perspective view that illustrates a device for producing a panel of an aircraft fuselage according to the invention.

FIGS. 3 and 4 show a device for producing a composite material part 30, more particularly suited for producing a large panel that can form a portion of the fuselage of an aircraft. Even if the invention is described for this application, it is in no way limited to the latter.

In a known manner, the composite material part comprises a fiber-reinforced resin matrix. According to a widely used embodiment, the composite material part is obtained from one or more fold(s) that may or may not be woven and that may or may not be pre-impregnated with thermosetting resin. As a variant, the fibers cannot be pre-impregnated, whereby at least one resin film is then necessary for forming the matrix.

To ensure the consolidation of the part, a device is used that makes it possible to enclose said part so as to keep the different elements—during the polymerization of the resin—in a given position so as to impart the desired shape to them.

For this purpose, the device comprises at least one mold 32 to which the different elements that constitute the part that is to be produced are attached. This mold has suitable shapes based on the desired shape of the part 30.

In the case of a fuselage panel, as illustrated in FIG. 4, the mold 32 comes in the form of a mandrel whose outside surface on which the folds of the part that is to be produced are draped has shapes that are adapted to those that are desired of the inside surface of the composite material part.

As appropriate, this mold 32 can be produced from a single part or from several parts that may or may not be movable between one another.

According to one embodiment, the mold can consist at least partially of the internal framework of the fuselage as described in the document FR-2,894,869.

The mold 32 is not presented in more detail because it is known by one skilled in the art and can assume different configurations based on the parts to be produced.

During the polymerization, the different elements that constitute the part are compressed so as to expel the air and the solvents, to reduce the porosity and to prevent the risks of defects that can reduce the mechanical characteristics of the part. For this purpose, the device comprises compression means. According to one embodiment, these compression means comprise a compacting bladder 34 that covers the elements of the part that is to be produced, sealing means 36 at the periphery of the elements of the part that is to be produced—ensuring the sealing between the mold 32 and the compacting bladder 34—as well as means 38 for generating negative pressure in the cavity 40 that is delimited by the mold 32 and the bladder 34 in which the elements of the part that is to be produced are arranged.

The compacting bladder 34, the seal 36, as well as the means 38 for generating the negative pressure are not presented in more detail because they are known by one skilled in the art. So as to evacuate the gases (air, solvent, etc.) that emanate from the part that is to be produced during the polymerization, the device comprises a drainage system.

According to the invention, the drainage system comprises at least one plate 42 that comprises a number of openings 44, as illustrated in detail in FIG. 3, whereby said plate 42 is shaped along the outside surface of the part that is to be produced. According to one advantage of the invention, the same element (the plate 42) is used to ensure the drainage and shaping functions.

This shaping and drainage plate 42 can be produced from different materials. Thus, it can be metal or made of a composite material. According to one embodiment, the shaping and drainage plate 42 is made of a composite material and has a thickness that is less than approximately 5 mm. Taking into account the ratio between its thickness and its surface area, the shaping and drainage plate 42 can be more or less flexible. However, it is not flexible in the manner of a fabric that can crumple.

To the extent that it cannot crumple, the installation of the shaping and drainage plate 42 is simple and quick, which leads to reducing the time of use. In addition, the fact that it is shaped along the outside surface of the part that is to be produced makes it possible to simplify its installation.

According to another advantage, the shaping and drainage plate 42 can be reused for several baking processes, contrary to the draining fabrics of the prior art, which makes it possible to achieve a gain in terms of costs and waste.

The drainage function is ensured by the number of openings 44 that make it possible to collect the gases from one side of the plate and to evacuate them from the other side of the plate.

According to the invention, the openings 44 have shapes and/or an arrangement that are suitable for limiting the degradation of the aerodynamic characteristics of said part that is to be produced.

As appropriate, the openings can have different geometries.

In the illustrated variant, the openings 44 have an approximately circular shape. This shape is simple to produce and makes it possible to obtain a good compromise between the drainage function and the fact of not producing marks on the outside surface of the part that is to be produced, able to degrade the aerodynamic characteristics of said part. However, other shapes can be considered.

The openings 44 have a diameter and a density that are suitable for ensuring in a satisfactory manner the drainage function without, however, producing marks on the outside surface of the part that is to be produced, able to degrade the aerodynamic characteristics of said part.

According to a characteristic of the invention, the openings have a section that is smaller than 5 mm$^2$. When they are circular, the openings have a diameter that is less than 1 mm so as not to produce marking that can degrade the aerodynamic characteristics of said part.

To ensure a satisfactory drainage function, the pitch between the two openings is on the order of 50 mm.

According to another characteristic of the invention, the openings are arranged along lines that are arranged in the direction of the flow of the aerodynamic flows, in staggered rows from one line to the next, whereby the openings of the same line are spaced between them at a distance on the order of 50 mm.

By way of indication, for openings with a diameter that is less than 1 mm and distributed along a pitch on the order of 50 mm, the open surface ratio, namely the ratio between the sum of the surfaces of the openings on the surface of the plate, is on the order of 1,256 mm$^2$/m$^2$ to obtain a good compromise between the drainage function and the fact of not producing marks on the outside surface of the part that is to be produced, able to degrade the aerodynamic characteristics of said part.

However, other arrangements can be considered to the extent that they make it possible to obtain a good compromise between the drainage function and the fact of not producing marks on the outside surface of the part that is to be produced, able to degrade the aerodynamic characteristics of said part.

According to the variants, the shaping and drainage plate 42 can be produced integrally or from several parts that are arranged end to end.

According to one embodiment that is illustrated in FIG. 4, for a given segment, the shaping and drainage plate 42 comprises four parts, an upper part 42.1, two side parts 42.2, 42.3, and a lower part 42.4.

According to another characteristic of the invention, the device comprises means 46 for evacuating the gasses that are collected by the drainage system.

According to one embodiment, these evacuation means 46 comprise, on the one hand, a fabric, for example fiberglass, interposed between the compacting bladder 34 and the shaping and drainage plate 42, and, on the other hand, at least one exhaust duct that advantageously makes it possible to draw in the gases.

To withdraw resin during the polymerization, a non-perforated film 48 that is liquid-tight but gas-permeable is interposed between the part 30 that is to be produced and the shaping and drainage plate 42.

Advantageously, a separating film 50 is provided in direct contact with the part, promoting the withdrawal of different layers that are attached to the part at the end of the process.

The invention claimed is:

1. A device for producing a composite material part for contact with aerodynamic flows in a direction of flow, comprising:
   a mold (32) constructed and arranged to directly support and provide shaping for a resin matrix of the composite material part to be produced at a first surface;
   a separating film (50) directly disposed on a second surface of the resin matrix of the composite material part to be produced, the second surface being opposite the first surface, the separating film (50) being constructed and arranged to detach the device from the resin matrix of the composite material part to be produced after the resin matrix has polymerized;
   a compression subunit (34, 36, 38) constructed and arranged to compress the composite material part to be produced, the compression subunit (34, 36, 38) including a compacting bladder (34), the compression subunit (34, 36, 38) configured to evacuate gases from the device in a direction away from the compacting bladder toward the mold (32); and
   a drainage system constructed and arranged to drain gases emanating from the composite material part during production, the drainage system including:
      a plate (42) disposed between the separating film (50) and the compacting bladder (34), a flexibility of the plate being limited so as not to permit the plate (42) to crumple upon itself, the plate defining a plurality of openings (44), the plate being constructed and arranged to both (i) drain the gases emanating from the composite material part and (ii) provide molding of the second surface of the resin matrix of the composite material part,
   wherein a shape of each opening and an arrangement of the plurality of openings are constructed and arranged such that degradation of aerodynamic characteristics of the composite material part to be produced are limited,
   wherein each of the plurality of openings has an area section that is smaller than 5 mm$^2$,
   wherein the plurality of openings (44) are arranged along lines that are arranged in a direction of the aerodynamic flows that contact the composite material part to be produced and in staggered rows from each line to each adjacent line, and
   wherein adjacent openings along any one of the lines are spaced apart at a distance of approximately 50 mm.

2. The device for producing the composite material part according to claim 1, wherein each of the plurality of openings (44) has an approximately circular shape.

3. The device for producing the composite material part according to claim 2, wherein each of the plurality of openings (44) has a diameter that is less than 1 mm.

4. The device for producing the composite material part according to claim 1, wherein the plurality of openings (44) are distributed with a pitch on the order of 50 mm.

5. The device for producing the composite material part according to claim 1, wherein the plate (42) is shaped according to an outside surface of the composite material part to be produced.

6. The device for producing the composite material part according to claim 1, further comprising:
   a gas evacuating element (46) for evacuating gases collected by the drainage system.

7. The device for producing the composite material part according to claim 6, wherein the gas evacuating element (46) includes a fabric that is interposed between the compacting bladder (34) and the plate (42), and at least one exhaust duct.

8. The device for producing the composite material part according to claim 1, further comprising:
   a non-perforated film (48) that is liquid-tight but gas-permeable and that is interposed between the composite material part to be produced and the plate (42).

9. The device for producing the composite material part according to claim 1, further comprising:
   a non-perforated film (48) disposed between the plate (42) and the separating film (50), the non-perforated film being constructed and arranged to prevent flow of liquids and allow flow of the gases.

10. The device for producing the composite material part according to claim 1, wherein the compacting bladder (34) is free of vacuum ports.

11. The device for producing the composite material part according to claim 1,
    wherein the mold (32) and the compacting bladder (34) delimit a cavity (40) that contains the separating film (50) and the drainage system, and
    wherein the mold (32) comprises a port in fluid communication with the cavity (40) and configured for connection to a means for generating a negative pressure within the cavity (40).

12. The device for producing the composite material part according to claim 11, wherein the port comprises a hole extending through a thickness of the mold (32).

13. The device for producing the composite material part according to claim 7,
    wherein the fabric extends over a top of the plate (42) and over an edge of the plate (42), between the compacting bladder (34) and the plate (42), and
    wherein the exhaust duct of the gas evacuating element (46) is in fluid communication with the port in the mold (32).

14. The device for producing the composite material part according to claim 1, wherein the compacting bladder (34) extends past an outermost perimeter of the plate (42) and over an edge of the plate (42) to form a cavity (40) delimited by the compacting bladder (34) and the mold (32).

15. The device for producing the composite material part according to claim 14, wherein the mold (32) comprises a port in fluid communication with the cavity (40) and configured for connection to a means for generating a negative pressure within the cavity (40).

16. The device for producing the composite material part according to claim 1, wherein the mold (32) has a curved outer surface, and a plurality of said plates (42.1, 42.2, 42.3) are arranged around the curved outer surface of the mold (32).

17. The device for producing the composite material part according to claim 1, wherein the plate is flexible, but not flexible in the manner of a fabric that crumples.

18. The device for producing the composite material part according to claim 9, wherein the separating film (50) is provided directly on a first surface of the non-perforated film (48), and the plate (42) is provided directly on an opposite second surface of the non-perforated film (48).

19. The device for producing the composite material part according to claim 6, wherein the compacting bladder (34) is provided directly on a first surface of the gas evacuating element (46), and the plate (42) is provided directly on a second surface of the gas evacuating element (46).

20. The device for producing the composite material part according to claim 19, further comprising:
   a non-perforated film (48) disposed between the plate (42) and the separating film (50), the separating film (50) provided directly on a first surface of the non-perforated film (48) and the plate (42) provided directly on an opposite second surface of the non-perforated film (48), the non-perforated film being constructed and arranged to prevent flow of liquids and allow flow of the gases.

\* \* \* \* \*